Nov. 25, 1924.  1,516,544
M. NOAH
SANDING DEVICE FOR VEHICLES
Filed July 18, 1924    3 Sheets-Sheet 1
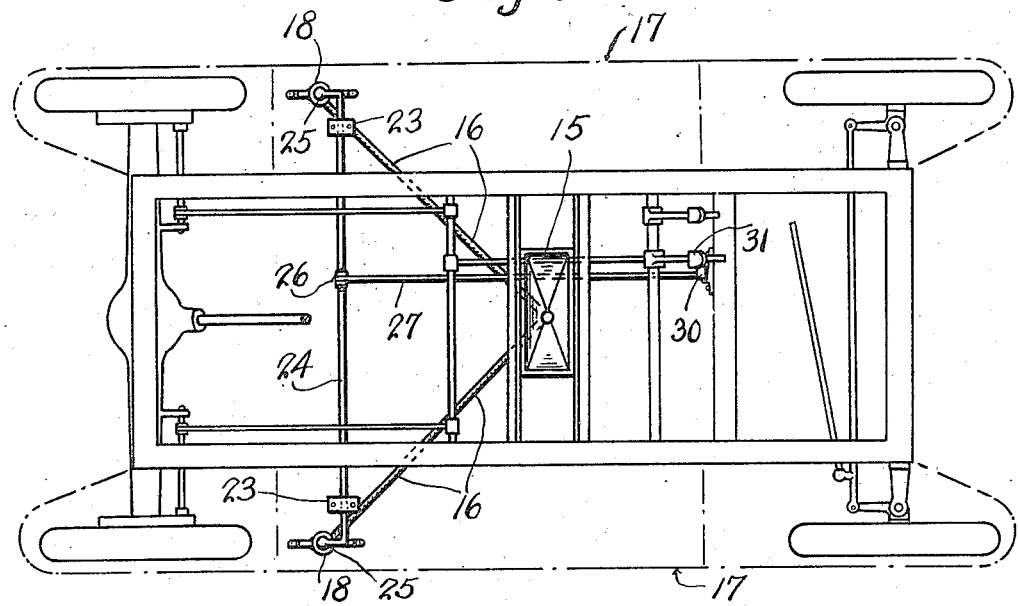
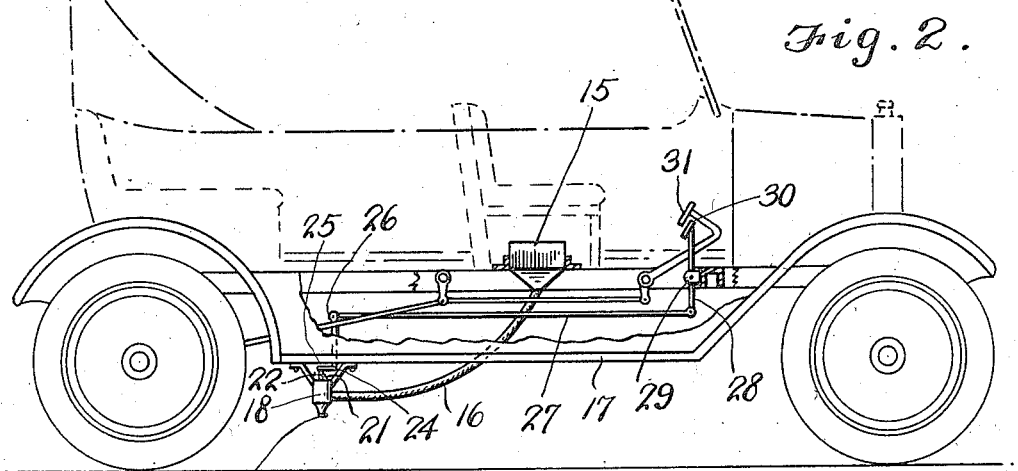
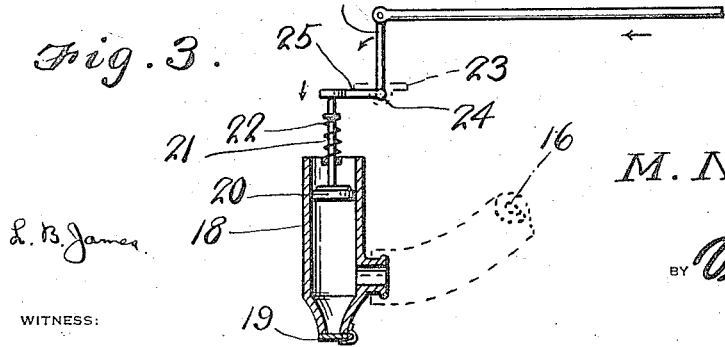
M. Noah
INVENTOR Nov. 25, 1924.
M. NOAH
1,516,544
SANDING DEVICE FOR VEHICLES
Filed July 18, 1924    3 Sheets-Sheet 2
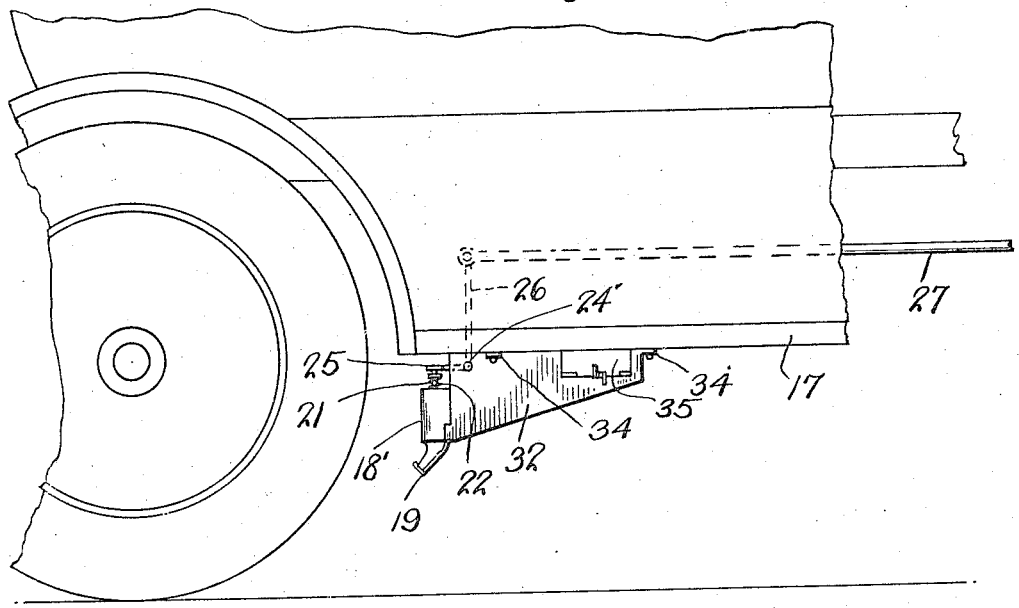
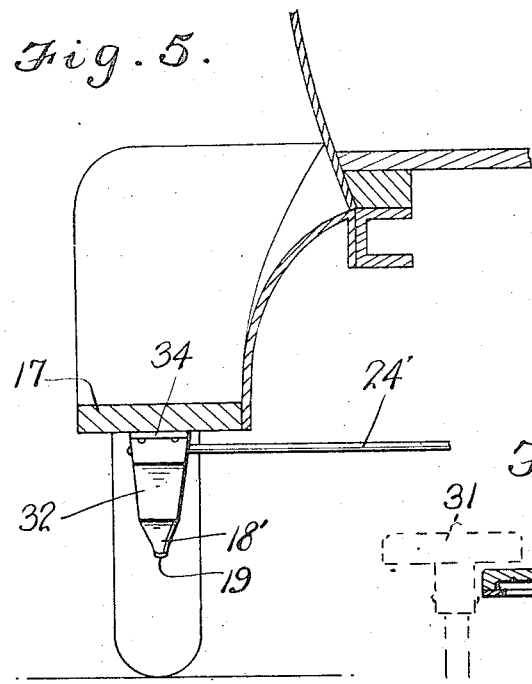
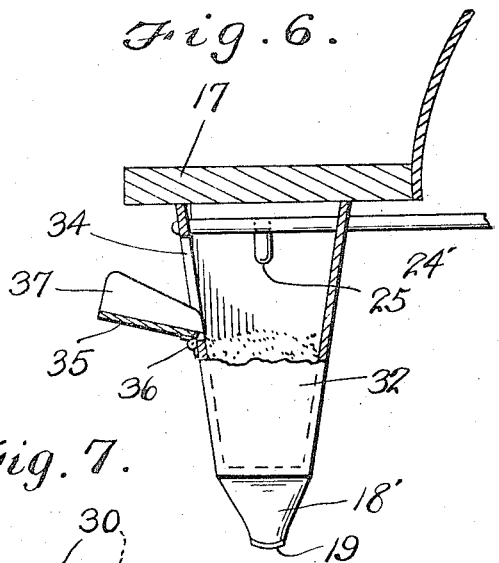
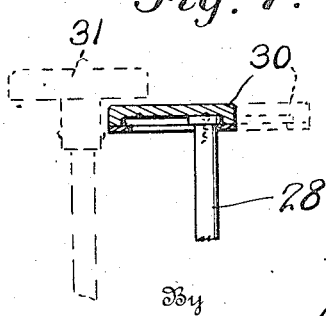
Inventor
M. Noah
By Victor J. Evans
Attorney
WITNESS Nov. 25, 1924.                                               1,516,544
M. NOAH
SANDING DEVICE FOR VEHICLES
Filed July 18, 1924        3 Sheets-Sheet 3
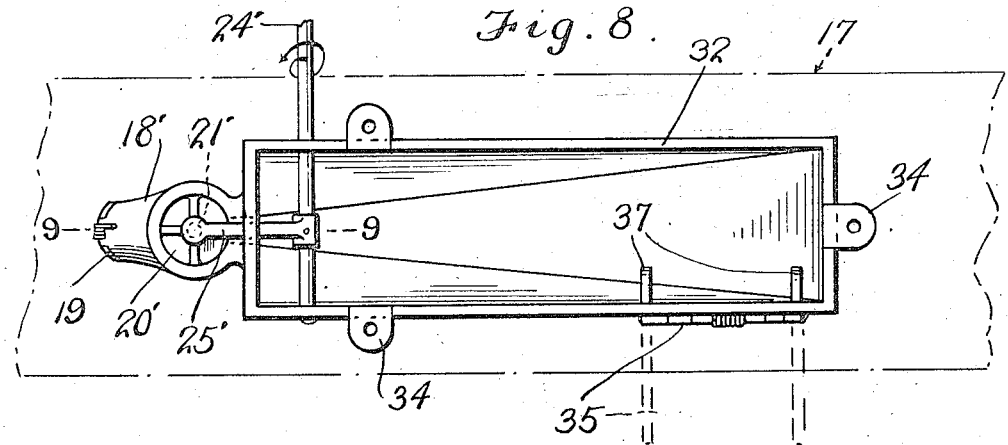
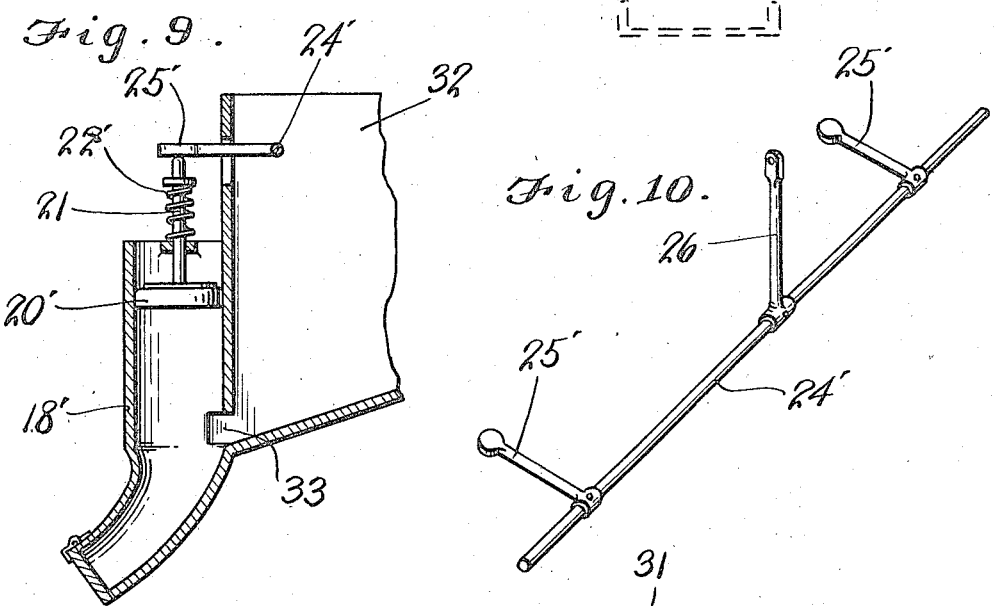
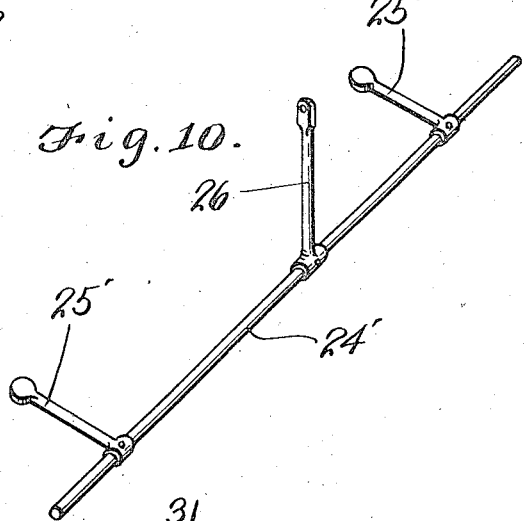
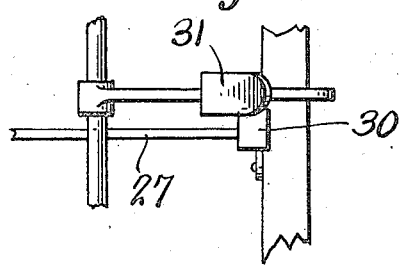
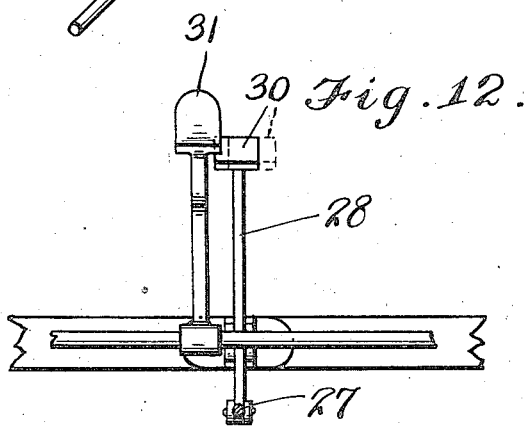
M. Noah   INVENTOR
BY Victor J. Evans   ATTORNEY
WITNESS: L. B. James Patented Nov. 25, 1924.

1,516,544

UNITED STATES PATENT OFFICE.

MORTIMER NOAH, OF NEW YORK, N. Y.

SANDING DEVICE FOR VEHICLES.

Application filed July 18, 1924. Serial No. 726,789.

*To all whom it may concern:*

Be it known that I, MORTIMER NOAH, a citizen of the United States, residing at New York, in the county of New York and State of New York, have invented new and useful Improvements in Sanding Devices for Vehicles, of which the following is a specification.

This invention relates to improvements in vehicles and has especial relation to a sanding apparatus for use upon automobiles, whereby sand may be discharged in advance of the driving wheels of the automobile for the purpose of providing sufficient traction surface to prevent skidding.

Another object of the invention is the provision of a sanding apparatus for this purpose which will be automatically operated by the operation of the brake mechanism, so that sand will be supplied with the application of the brakes.

Another object of the invention is the provision of means which is included in a mechanism of this character, whereby the said mechanism may remain inactive when the brakes are applied, so that the device will not be unnecessarily operated.

With the above and other objects in view, the invention further includes the following novel features and details of construction, to be hereinafter more fully described, illustrated in the accompanying drawings and pointed out in the appended claims.

In the drawings:—

Figure 1 is a top plan view of a portion of the chassis of an automobile with the invention applied, the outline of the fenders being shown by dotted lines.

Figure 2 is a side elevation of the same partly broken away with the body shown by dotted lines.

Figure 3 is an enlarged fragmentary sectional view of the discharge nozzle and contiguous mechanism.

Figure 4 is a fragmentary side elevation illustrating a modified form of the invention.

Figure 5 is a fragmentary transverse sectional view showing a portion of the subject matter of Figure 4 on an enlarged scale.

Figure 6 is an enlarged fragmentary view partly in elevation showing the hopper illustrated in Figures 4 and 5.

Figure 7 is a fragmentary view partly in section showing the operative connection between the sanding lever and the brake pedal, the latter being shown by the dotted lines.

Figure 8 is a top plan view of one of the sand hoppers used in the form of the invention illustrated in Figures 4 to 6, a portion of the running board of the automobile being shown by dotted lines.

Figure 9 is a section taken substantially on the line 9—9 of Figure 8.

Figure 10 is a detail perspective view of the rock shaft.

Figure 11 is a fragmentary plan view showing the automobile brake pedal and its manner of engagement with the sanding lever.

Figure 12 is an elevation of the same.

Referring to the drawings in detail wherein like characters of reference denote corresponding parts, the reference character 15 in Figures 1 and 2 of the drawings illustrates a hopper which is adapted to contain sand and which is preferably secured beneath the front side of an automobile and extends downwardly through the floor of the latter. The hopper is provided with a downwardly inclined bottom from which extends divergent pipes or conduits 16 whose outer ends extend beneath the running boards 17 of the automobile and are secured to a discharge nozzle 18.

The lower restricted ends of these discharge nozzles are normally closed by spring actuated bottoms 19, while operating within each of the nozzles 18 is a plunger 20. This plunger is adapted to be depressed to force sand outward through the discharge mouth of the nozzle, the sand having previously entered the nozzle through the pipe 16.

The plunger 20 is provided with a stem 21 which operates through a suitable guide provided in the top of the nozzle 18 and is normally forced upward by means of a coiled spring 22.

Mounted transversely of the automobile in suitable bearings 23 is a rock shaft 24 and extending from this shaft for engagement with the stems 21 of the plungers are presser arms 25. Also extending from the shaft 24 is an arm 26 which has pivotally secured thereto one end of a connecting rod 27. The opposite end of this rod extends forwardly and is pivotally connected to the lower end of a sanding or operating lever 28 which extends upward through the floor board of the automobile and is pivotally mounted as shown at 29.

The upper end of the lever 28 has mounted thereon a head 30 which is capable of lateral sliding movement upon said lever Figures 7 and 12 so that it may be moved into and out of position beneath the foot pedal 31 of the usual brake mechanism of the automobile.

When the pedal 31 is pressed downward for the application of the brakes it will engage the head 30 of the lever 28 and will move the latter pivotally to depress the plunger 20 so as to force sand outward through the discharge mouth of the nozzle in front of the driving wheels of the automobile, as previously explained. When it is not desired to use the sanding mechanism, the head 30 may be moved laterally to the position shown by the dotted lines in Figure 7 so that the brake pedal 30 may be freely depressed without engaging said head and consequently without operating the sanding mechanism.

In the form of the invention just described a discharge nozzle upon each side of the automobile is supplied with sand from a common hopper. In the form now to be described, each discharge nozzle 18' is provided with an individual hopper 32 which is secured beneath the running boards 17 and which communicates with the nozzles 18' through openings 33, as shown in Figure 9 of the drawings. Each nozzle 18' is provided with a plunger 20' from which extends a stem 21'. This stem is provided with a spring 22' which normally holds the plunger elevated, while the presser bars 25' which extend from the rock shaft 24' are operated to depress the plungers 20' as in the preceding form of the invention.

Each of the hoppers 32 is provided with apertured ears 34 so that they may be attached beneath the running board 17. In addition, the hoppers 32 are provided with filling openings 35 through which sand may be introduced into the hopper. These openings are normally closed by a door or closure 35 which is hingedly mounted as at 36. The opposite edges of this door are provided with inwardly extending parallel flanges 37 so that a scoop is formed for guiding the sand into the hopper, as will be readily seen from Figure 6 of the drawings.

The invention is susceptible of various changes in its form, proportions and minor details of construction and the right is herein reserved to make such changes as properly fall within the scope of the appended claims.

Having described the invention what is claimed is:

1. In a sanding device for automobiles, a sand hopper, a discharge nozzle positioned in advance of each of the rear wheels of the automobile and arranged to receive sand from the sand hopper, means including a pivotally mounted brake pedal operated lever for controlling the discharge of sand from the nozzles and a laterally slidable head capable of being moved into and out of the path of said lever for controlling the operation of the lever.

2. In a sanding device for automobiles, a sand hopper, discharge nozzles positioned in advance of the drive wheels of the automobile and arranged to receive sand from the sand hopper, spring actuated normally closed discharge mouths for the nozzles, plungers operating within the nozzles for forcing the closures open and discharging sand from said nozzles, stems extending from the plungers, a rock shaft extending transversely of the automobile, pressure arms carried by the rock shaft and engaging the stems, whereby the latter may be depressed to operate the plungers when the shaft is rocked and means controlled by the brake pedal for rocking the shaft.

In testimony whereof I affix my signature.

MORTIMER NOAH.